Jan. 12, 1932.  J. R. SMITH  1,840,854
DRIVE MECHANISM AND ARTIFICIAL BAIT
Original Filed Jan. 12, 1928
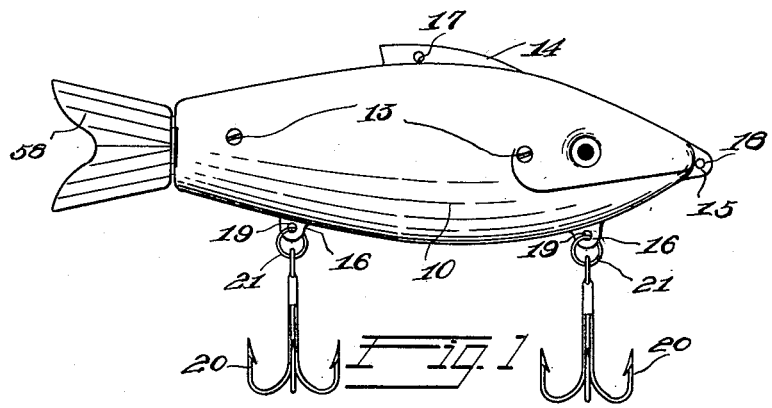
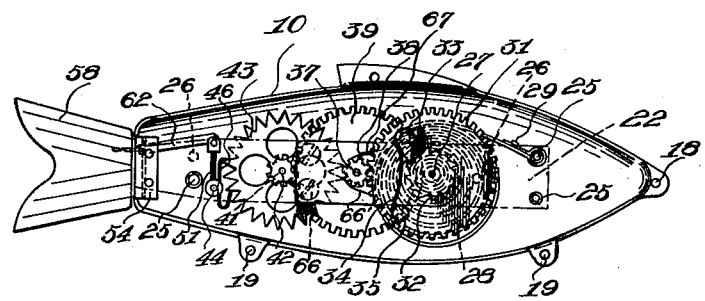
Inventor
Jesse R. Smith
William A. Strauch
Attorney Patented Jan. 12, 1932

1,840,854

UNITED STATES PATENT OFFICE

JESSE R. SMITH, OF BENTON, ILLINOIS, ASSIGNOR OF ONE-HALF TO HARRY STOTLAR, OF BENTON, ILLINOIS

DRIVE MECHANISM AND ARTIFICIAL BAIT

Application filed January 12, 1928, Serial No. 246,202. Renewed June 6, 1931.

The present invention relates to drive mechanisms and to improved artificial bait, and more particularly the invention relates to improved drive mechanisms especially adapted for toys, mechanically operated figures simulating the appearance and motions of live bait and the like.

It has been heretofore proposed to provide artificial bait in the form of a fish or other live object utilizing a casing in the general form of live bait provided with a tail member and a mechanical motor carried within the casing adapted to actuate the tail member. Such prior constructions have, however, been more or less complicated and consequently expensive to manufacture, and due to the multiplicity of parts, readily get out of working order. Furthermore in such prior proposed constructions the motion transmitting means between the mechanical motor and tail member were such as to require periodic rewinding of the motor at comparatively close intervals of time, thus interfering in a large measure with the effectiveness of the constructions for the purposes for which they are intended.

Accordingly, a primary object of this invention is the provision of an improved artificial bait, toy, or the like, comprising a body portion, a movable member, and improved mechanical means within the body portion to actuate the movable member.

Another object of the invention is the provision of an improved artificial bait, toy or the like, comprising a body portion simulating live bait, and provided with a movable member, and spring operated means within the body portion adapted to impart movement to the movable member for a comparatively long period of time without rewinding of the spring.

Still another object of the invention is the provision of an improved artificial bait, simple in construction, reliable in operation, and inexpensive to manufacture.

A still further object of the invention is the provision of a novel and simplified spring motor mechanism especially useful for driving the moving parts of artificial bait, toys, and the like.

Still further objects of the invention are such as may be attained by a utilization of the various combinations and subcombinations hereinafter set forth in detail, and as defined by the scope of the appended claims.

Referring to the drawings:—

Figure 1 is a side elevational view of the improved bait showing the attachment of the hooks thereto.

Figure 2 is a similar view with one plate forming part of the body portion removed disclosing the operating mechanism within the body portion.

Figure 3 is a longitudinal section through the body portion or casing showing the operating mechanism in top plan, and, Figure 4 is a side elevational view on an enlarged scale of the tail member and driving mechanism directly associated therewith, the view being from the opposite side to that shown in Fig. 2.

As shown in the drawings by reference characters, in which like characters designate like parts, 10 designates the body portion which is in the form of a casing made in the shape of a fish as shown, or in the shape of any other live bait object, such as a frog or the like, and is preferably formed of two like halves 11 and 12 adapted to engage in a central vertical plane as indicated in Figure 3, the half casing sections being secured to the operating mechanism by means of securing elements in the nature of screws as indicated at 13 in Figure 1.

The casing sections 11 and 12 are preferably constructed of thin sheet metal and are provided with alined lugs 14, 15 and 16.

Lugs 14 are in the shape of a fin and are provided with registering apertures 17 adapted for the attachment of a line. Lugs 15 are provided with registering apertures 18 adapted for the attachment of a line in case the use of a reel is desired, and lugs 16 are provided with registering apertures 19 adapted for the detachable connection of suitable hooks 20 through the instrumentality of small split ring members 21.

Supported within the casing 10 is a frame member 22 comprising comparatively narrow elongated side members 23 and 24 connected together and supported in spaced relation by means of the posts 25, the side members being provided with tapped holes 26 which receive the screws 13 to detachably secure the casing sections 11 and 12 to the frame member 22.

Rotatably supported within the side members 23 and 24 and extending transversely thereof is a shaft 27 to which one end of a spiral spring 28 is secured, the other end of which is looped around one of the posts 25 and secured in engagement with the body portion of spring 28 by means of a securing element 29.

Loosely mounted on shaft 27 adjacent spring 28 is a gear wheel 31 and fixedly carried by shaft 27 adjacent gear wheel 31 is a ratchet wheel 32.

Pivotally connected to the gear wheel 31 is a pawl 33 which is normally held in engagement with the teeth of ratchet wheel 32 by means of spring 34 secured to gear wheel 31 as shown at 35.

The end of the shaft 27 opposite the end to which ratchet wheel 32 is secured extends through the casing 10 and is squared as shown at 36 for the application of a suitable key.

Rotatably supported within said members 23 and 24 and extending transversely thereof adjacent shaft 27 is a second shaft 37 which carries pinion 38 in mesh with the gear wheel 31. Shaft 37 adjacent its end opposite pinion 38 carries a gear wheel 39 to mesh with pinion 41 carried by a third shaft 42 rotatably supported by the side members 23 and 24.

Shaft 42 has secured thereto, a combination drive and escapement wheel 43 which is disposed adjacent the pinion 41 and substantially centrally of side members 23 and 24 as clearly indicated in Figure 3. Rotatably mounted in the side members 23 and 24 adjacent wheel 43 is a shaft 44 which is recessed as indicated at 45 for the reception of the body portion of a yieldable driving escapement 46 which is rigidly secured to the shaft 44 within the recessed portion 45 thereof.

Driving escapement 46 as is more clearly shown in Figure 4 is provided with a curved upper end portion 47 adapted to alternately engage the opposite inclined edges of the teeth of the wheel 43 while at its lower end the escapement is provided with a curved portion 48 and a terminal 49 disposed at an angle to the body portion which is secured to the shaft 44. The angular terminal portion 49 is yieldable and is adapted to be engaged by the forward edges of the teeth of the wheel 43 as the wheel rotates which imparts an oscillating movement to escapement 46 and accordingly to the shaft 44.

Carried by the shaft 44 and extending upwardly therefrom is an arm 51 provided at its free end with an apertured bifurcated member 52. Side member 24 is bent inwardly adjacent its rear end and provided with a relatively short flat portion 53 to which a bracket 54 is secured. Bracket 54 comprises upper and lower parallel ears 55 which support the ends of a vertically mounted shaft 56. Mounted for oscillating movement on the shaft 56 by means of sleeves 57 is a tail member 58.

Tail member 58 adjacent one of the sleeves 57 is provided with an extension 59 disposed at right angles thereto, which as more clearly shown in Figure 3 is provided with an elongated aperture 61, the aperture being formed by a closing tongue 61' integral with extension 59. Pivotally connected at one end thereof within bifurcated member 52 is an actuating arm 62 which at its opposite end is provided with an elongated aperture 63 adapted to receive tongue 61'.

In order to prevent the spring 28 during its expansion from coming into contact with shaft 37 and interfering with the rotation thereof, a suitable bracket or guard 65 is secured to side member 24 by means of screws 66. Bracket 65 as is more clearly shown in Figure 2 is provided with a cutout portion 66' to permit passage of the shaft 37 and extensions 67 resulting from the cut out portion 66' are adapted to engage spring 28 and consequently limit its expanding movement in the direction of the shaft 37.

In operation of the device hereinabove described, a suitable key is applied to squared end 36 of the shaft 27 whereupon the shaft is rotated compressing the spring 28 during which operation ratchet wheel 32 slips by pawl 33 due to the sloping edges of the ratchet teeth facing the pawl in the winding operation.

When the spring 28 has been wound up or compressed, the spring tends to rotate shaft 27 in a direction opposite to that in which shaft 27 was rotated during winding and pawl 33, being held in engagement with a radial edge of a tooth of ratchet wheel 32 by means of spring 34, the rotative movement of the shaft 27 is transmitted to the loosely mounted gear wheel 31 through ratchet wheel 32 and pawl 33 which is pivotally secured to gear wheel 31. Gear wheel 31 meshes with pinion 38 which in turn causes rotation of the shaft 37 and consequently gear wheel 39 which is fixed to the shaft 37. Gear wheel 39 accordingly rotates faster than the gear wheel 31 in a proportion equal to the ratio of the diameters of the gear wheel 31 and pinion 38 respectively. Gear wheel 39 in turn meshes with pinion 41 which causes rotation of the combination drive and escapement wheel 43 through the shaft 42, the wheel 43 rotating faster than the gear wheel 39 in proportion to the ratio of the diameters of gear wheel 39 and pinion 41 respectively.

It will thus be seen that the combination drive and escapement wheel 43 rotates much faster than, and in the same direction as gear wheel 31 and that the speed of rotation of the gear wheel 39 is intermediate that of the wheels 31 and 43 and opposite in direction.

As the wheel 43 rotates the advancing tapered edges of the teeth thereof successively engage the angular terminal portion 49 of the driving escapement 46 and force the terminal portion outwardly at which instant the yieldable terminal portion snaps back in the succeeding space between two adjacent teeth and the upper curved portion 47 engages an advancing edge of one of the teeth which upon further rotation of the wheel forces the curved portion 47 outwardly out of engagement with such edge until it springs back into a succeeding space between two adjacent teeth, at which instant the terminal portion 49 is again in engagement with an advancing edge of one of the teeth. Thus the continued rotation of the combination drive and escapement wheel 43 imparts an oscillating movement to the driving escapement 46 and accordingly to the shaft 44 to which the escapement 46 is secured. It is to be particularly noted that the proper operation of the escapement 46 depends upon a yieldable or resilient action thereof as the teeth of the wheel 43 successively engage the opposite ends of the escapement. The action above described could not be obtained in a rigid member corresponding to the member 46.

As shaft 44 oscillates it imparts a to and fro motion to the arm 51 which in turn imparts an oscillating movement to the actuating arm 62. As arm 62 oscillates it imparts an oscillating or vibrating motion to the tail member 58 through its connection with the extension 59 carried by the tail member. The end of arm 62 is operatively connected to the extension 59 and moves laterally in aperture 61 imparting a quick snap movement to the tail member.

It is to be particularly noted that access to the operating mechanism is readily obtained due to the removable casing sections 23 and 24 which can be removed from the frame 22 by detaching the line or lines, the hooks 20 and four screws.

It will be obvious to those skilled in the art that an effective, simple, reliable, and inexpensive artificial bait and mechanical motor construction has been provided, the details of which may be varied widely without departing from the spirit of my invention. Accordingly, I have described a preferred embodiment only of my invention.

What is desired to be secured by Letters Patent, and claimed as new is:—

1. An artificial bait comprising a frame member; a combination drive and escapement wheel rotatably supported by said frame member; a tail member supported by said frame member for oscillating movement; a shaft rotatably supported by said frame member adjacent said combination drive and escapement wheel; a driving escapement carried by said shaft for oscillating movement by said combination drive and escapement wheel; a radially extending arm carried by said shaft; an actuating arm pivotally connected at one end thereof to said first arm and having its opposite end operatively engaged with said tail member for imparting oscillating movement thereto; and means carried by said frame member for imparting rotation to said combination drive and escapement wheel.

2. The combination defined in claim 1 in which said operative engagement of said actuating arm with said tail member comprises a lateral apertured projection carried by said tail member and in which said actuating arm is provided with an aperture adjacent the end thereof loosely receiving an edge portion of said projection opposite the aperture therein.

3. The combination defined in claim 1 in which said driving escapement comprises a flat spring member rigidly secured to said shaft intermediate the ends thereof and disposed normally in vertical position, the upper end of said spring member being bent over for engagement with the advancing edges of the teeth of said combination drive and escapement wheel, and the lower end thereof being bent over providing a straight terminal portion angularly disposed relative to the body portion of said spring member for engagement with the advancing edges of the teeth of said combination drive and escapement wheel, whereby said driving escapement is caused to oscillate upon rotation of said combination drive and escapement wheel.

In testimony whereof I affix my signature.

JESSE R. SMITH.